United States Patent
Ingvalson et al.

(10) Patent No.: US 8,812,235 B2
(45) Date of Patent: Aug. 19, 2014

(54) ESTIMATION OF N-DIMENSIONAL PARAMETERS WHILE SENSING FEWER THAN N DIMENSIONS

(75) Inventors: Ryan Ingvalson, Saint Michael, MN (US); Wesley J. Hawkinson, Chanhassen, MN (US); Robert C. McCroskey, Burnsville, MN (US); Paul Samanant, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 13/368,823

(22) Filed: Feb. 8, 2012

(65) Prior Publication Data

US 2012/0209520 A1 Aug. 16, 2012

Related U.S. Application Data

(60) Provisional application No. 61/442,263, filed on Feb. 13, 2011.

(51) Int. Cl.
*G01C 21/16* (2006.01)

(52) U.S. Cl.
CPC .................................... *G01C 21/165* (2013.01)
USPC ............ 701/507; 701/510; 701/505; 701/526

(58) Field of Classification Search
None
See application file for complete search history.

(56) References Cited

U.S. PATENT DOCUMENTS

| | | | |
|---|---|---|---|
| 4,212,443 A | | 7/1980 | Duncan et al. |
| 4,507,737 A | | 3/1985 | LaSarge et al. |
| 6,292,751 B1 * | | 9/2001 | Frank ............................ 701/507 |
| 6,459,990 B1 | | 10/2002 | McCall et al. |
| 6,826,478 B2 * | | 11/2004 | Riewe et al. ................... 701/470 |
| 7,561,960 B2 * | | 7/2009 | Soehren ......................... 701/510 |
| 2003/0216865 A1 | | 11/2003 | Riewe et al. |
| 2005/0125141 A1 | | 6/2005 | Bye |
| 2005/0197769 A1 * | | 9/2005 | Soehren et al. ............... 701/220 |
| 2006/0016261 A1 | | 1/2006 | Tanaka et al. |
| 2006/0287824 A1 | | 12/2006 | Lin |
| 2007/0100550 A1 | | 5/2007 | Hawkinson |
| 2009/0254276 A1 * | | 10/2009 | Faulkner et al. ............... 701/213 |

OTHER PUBLICATIONS

European Patent Office, "Office Action", "from Foreign Counterpart of U.S. Appl. No. 13/368,823", Dec. 2, 2013, pp. 1-6, Published in: EP.
European Patent Office, "European Search Report", "from Foreign Counterpart of U.S. Appl. No. 13/368,823", Nov. 15, 2013, pp. 1-3, Published in: EP.
European Patent Office, "Office Action from EP Application No. 12154961.2 mailed Mar. 26, 2014", "from Foreign Counterpart of U.S. Appl. No. 13/368,823", Mar. 26, 2014, pp. 1-4, Published in: EP.

* cited by examiner

*Primary Examiner* — Michael J Zanelli
(74) *Attorney, Agent, or Firm* — Fogg & Powers LLC (57) ABSTRACT

Embodiments of the present invention provide improved systems and methods for estimating N-dimensional parameters while sensing fewer than N dimensions. In one embodiment a navigational system comprises a processor and an inertial measurement unit (IMU) that provides an output to the processor, the processor providing a navigation solution based on the output of the IMU, wherein the navigation solution includes a calculation of an n-dimensional parameter. Further, the navigational system includes at most two sensors that provide an output to the processor, wherein the processor computes an estimate of an n-dimensional parameter from the output of the at most two sensors for bounding errors in the n-dimensional parameter as calculated by the processor when the trajectory measured by the IMU satisfies movement requirements, wherein "n" is greater than the number of the at most two sensors.

20 Claims, 5 Drawing Sheets

ESTIMATION OF N-DIMENSIONAL PARAMETERS WHILE SENSING FEWER THAN N DIMENSIONS

CROSS REFERENCE TO RELATED APPLICATIONS

This application claims the benefit of U.S. Provisional Application No. 61/442,263, filed on Feb. 13, 2011 (hereinafter the '263 Application). The '263 Application is incorporated herein by reference.

BACKGROUND

Inertial navigation systems (INS) are used to determine parameters such as position, orientation, and velocity in a moving platform such as an aircraft, a spacecraft, a watercraft or a guided missile. The INS calculates these parameters using dead reckoning without the need for external references.

At the heart of the INS is an inertial measurement unit (IMU). The IMU typically includes three motion sensors (accelerometers) and three rotation sensors (gyroscopes). The three motion sensors are placed such that their measuring axes are orthogonal to each other. Similarly, the rotation sensors are also placed in a mutually orthogonal relationship to each other. The IMU provides measurements of motion and rotation to the INS to derive a navigation solution composed of position, orientation and velocity.

One known problem with an INS is error accumulation. Each measurement made by the IMU has an inherent error. Over time, the INS adds current measurements from the IMU to prior navigation solutions. Thus, with the addition of each measurement, the INS accumulates additional errors in the produced navigation solution.

The accuracy of the INS is improved by using outputs of additional sensors that effectively bound the error of the INS. For example, INS systems typically include one or more of global positioning system (GPS), Doppler, and other sensors that provide inputs to the INS to offset the accumulated errors.

In a recent development, personal navigation systems are being developed based on an INS platform. Such personal navigation systems can be used by emergency responders so that the position and movement of each responder in a three-dimensional structure can be instantaneously displayed in a command center. However, several problems are inherent in the design of personal navigation systems. First, an INS platform typically has a high power requirement due to the IMU and the other sensors required for accurate position, velocity and orientation information. Further, the size of a typical INS may be larger than desirable for personal navigation systems.

SUMMARY

The Embodiments of the present disclosure provide methods and systems for reducing the size and power requirements of an inertial navigation system with a reduction in the number of additional sensors used to reduce accumulated errors and will be understood by reading and studying the following specification.

Embodiments of the present invention provide improved systems and methods for estimating N-dimensional parameters while sensing fewer than N dimensions. In one embodiment a navigational system comprises at least one processor and an inertial measurement unit (IMU) that provides an output to the at least one processor, the at least one processor providing a navigation solution based on the output of the IMU, wherein the navigation solution includes a calculation of an n-dimensional parameter. Further, the navigational system includes at most two sensors that provide an output to the at least one processor, wherein the at least one processor computes an estimate of an n-dimensional parameter from the output of the at most two sensors for bounding errors in the n-dimensional parameter as calculated by the at least one processor when the trajectory measured by the IMU satisfies movement requirements, wherein "n" is greater than the number of the at most two sensors.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention describe a system and method for an n-dimensional estimation of a system motion parameter using fewer than n single-axis sensors. In one example, a 3-dimensional velocity estimation is accomplished in an inertial navigation system (INS) using one or two velocity sensors. Conventionally, INS systems use more than one velocity sensor for platform velocity estimation. Typically, such systems use three or more velocity sensors to determine the three dimensional platform velocity that is used to adjust accumulated errors in the navigation solution of an inertial measurement unit (IMU). In contrast, it has been discovered that, in systems with a platform trajectory that moves in at least one of pitch, roll and yaw, velocity errors in the IMU can be bounded with fewer sensors than the dimension number of the velocity vector. For example, a solitary single-axis velocity sensor can be used to bound three dimensional velocity errors when the trajectory of the platform movement includes appropriate motion in two of pitch, roll, and yaw that provides measurements in three dimensions. Further, two single-axis velocity sensors can be used to bound three-dimensional velocity errors when there is appropriate motion in one of pitch, roll, or yaw that provides measurements in three dimensions. In such systems, it has been shown that the integrated INS platform, aided by fewer than three velocity sensors, exhibits bounded velocity error under the dynamics of the trajectory.

Embodiments of the present disclosure solve the problem of unbounded INS velocity error by exploiting platform dynamics to acquire earth-referenced velocity in more than one dimension using a solitary single-axis velocity sensor. These multi-dimensional measurements are obtained by changing the direction (i.e. attitude) of the platform, which in turn changes the direction of observation of the velocity sensor. Thus, the growth of the INS system velocity error will be a function of the quality of the inertial sensors, the velocity sensor specifications, and the rate at which the velocity sensor's line-of-sight spans the three-dimensional space of the platform's local-vertical coordinate system. Specifically, the quality of the inertial sensors, the quality of the velocity sensor(s), and the velocity sensor(s)' measurement rates will determine the rate at which the platform must rotate in order to bound the velocity error growth.

Figure 1:
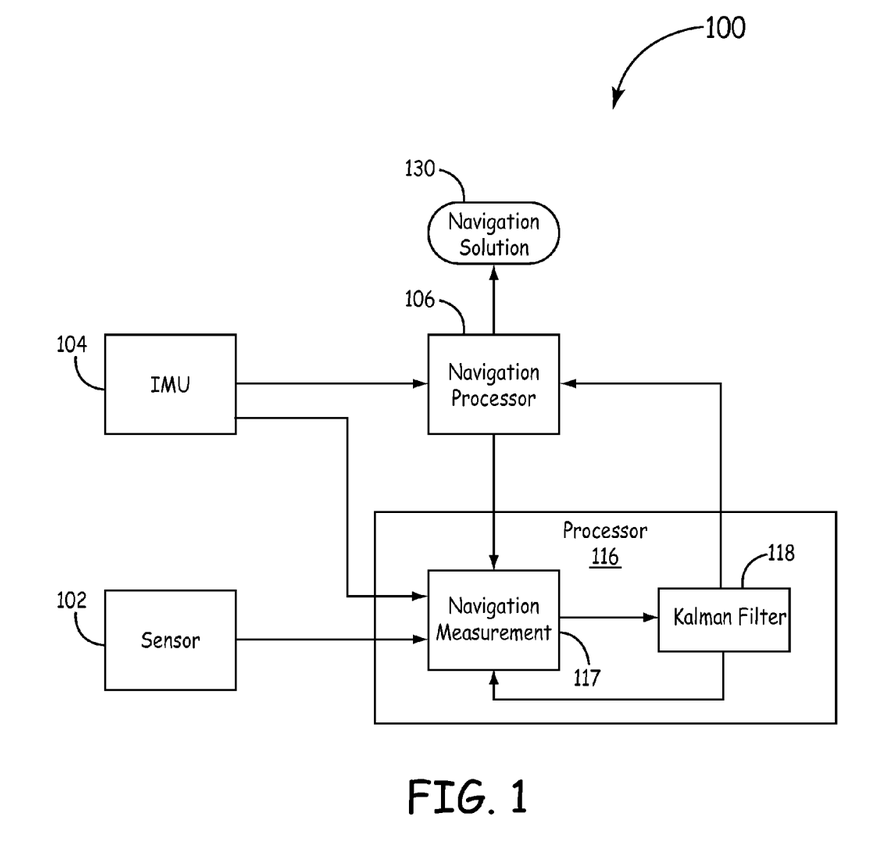
FIG. 1 is a block diagram of one embodiment of a system that estimates an n-dimensional parameter using a sensor that measures less than n dimensions.
Figure 3A:
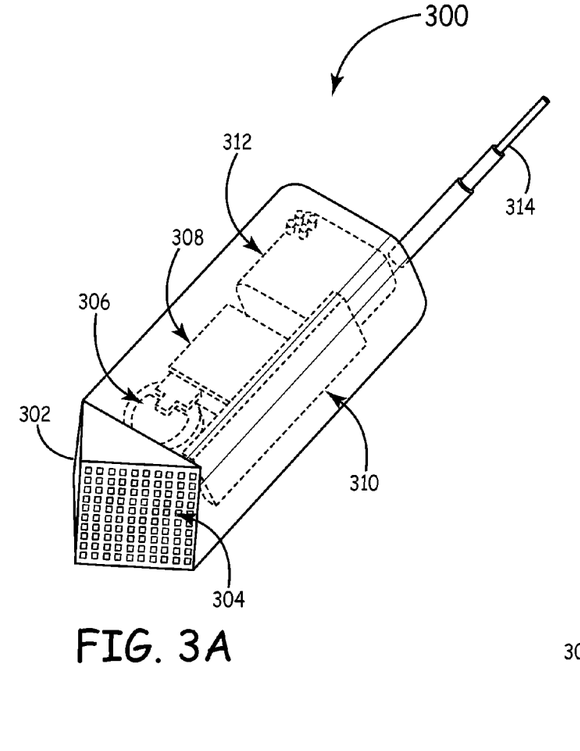
FIGS. 3A and 3B are block diagrams of personal navigation systems that estimate a multi-dimensional velocity using single-axis sensors that are fewer in number than the dimensions of the multi-dimensional velocity.
Figure 3B:
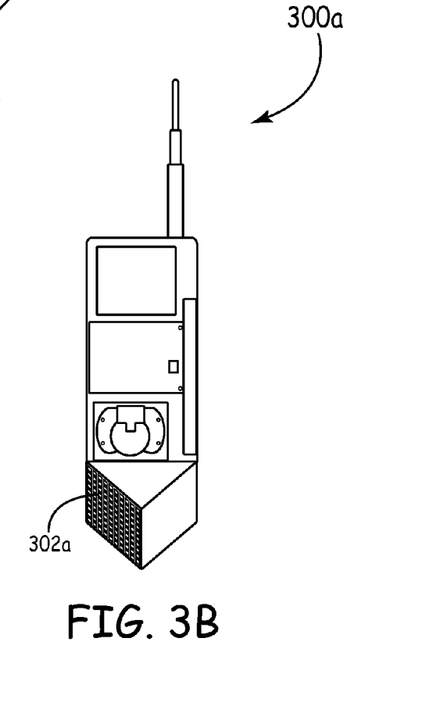

FIG. 1 is a block diagram of a navigation system, indicated generally at 100, that estimates an n-dimensional parameter using a sensor 102 that measures motion parameters along less than n-dimensions. In one implementation, system 100 uses sensors 102 that are single-axis sensors. Alternatively, sensors 102 are sensors that measure in multiple dimensions. In at least one embodiment, sensors 102 are velocity sensors. When sensors 102 are velocity sensors, the measurements from the velocity sensors are used to estimate the 3-dimensional earth reference velocity of a platform when the platform experiences motion in either pitch, roll, or yaw. For example, the measurements from the velocity sensors can estimate the 3-dimensional velocity on a platform that is a personal navigation system, which is illustrated in FIGS. 3A and 3B described in more detail below.

System 100 generates a navigation solution 130 based on sensed parameters. To form navigation solution 130, in certain embodiments, system 100 includes an IMU 104. In certain embodiments, IMU 104 includes three sensors that measure motion along three orthogonal axes such as accelerometers that measure acceleration along three orthogonal axes. IMU 104 also includes three sensors that measure rotation about three orthogonal axes such as three gyroscopes that measure rotation about three orthogonal axes.

Also, IMU 104 is coupled to an inertial navigation processor 106 and provides motion and rotation measurements to inertial navigation processor 106. Inertial navigation processor 106 generates a navigation solution, which includes position, velocity and attitude data of the platform of system 100 based on the motion and rotation measurements received from IMU 104. Further navigation processor 106 provides the navigation solution to a processor 116. As shown in FIG. 1, Navigation processor 106 and processor 116 are separate processors, however a single processor is able to perform both the functionality of navigation processor 106 and processor 106. Also, processor 116 receives motion information from sensors other than IMU 104, like sensors 102. Processor 116 processes the motion information received from both IMU 104 and sensors 102 to bound errors in the navigation solution.

Processor 116 includes a Kalman filter 118. In some implementations, the processor 116 converts raw sensor data into a common time base and coordinate frame. Further, from the conversion of the raw sensor data, processor 116 forms a navigation measurement 117 for Kalman filter 118. When processor 116 forms the navigation measurement 117 for Kalman filter 118, processor 116 writes the navigation measurement 117 as a linear function of the states of Kalman filter 118. This is known as forming the "H matrix" of a Kalman filter. In addition, if the states are modeled as navigation errors (which they typically are), the navigation measurement 117 sent to the Kalman filter 118 is usually a "measurement difference", i.e. it is a difference between a quantity derived directly from the navigation solution and the output of the sensors 102 used to bound the errors in the navigation solution.

Kalman filter 118, executing on processor 116, processes the navigation measurement 117, which in some implementations includes the data from sensors 102. Kalman filter 118 determines a set of resets, based on the data processed by processor 116, that are provided to navigation processor 106. Since the platform experiences appropriate motion in either pitch, roll, or yaw, Kalman filter 118 is able to provide appropriate resets to navigation processor 106 to keep the error bounded even with sensors 102 that sense in fewer dimensions than the dimensions, e.g., 3, of the error bounded in the navigation solution for the platform.

As an additional benefit, when sensors 102 are velocity sensors, movement of the platform containing system 100 in pitch, roll, or yaw allows processor 116 to use data from sensors 102 to estimate measurements for the accelerometers in IMU 104 in all three body axes of the system 100 via Kalman filter 118. Kalman filter 118 maintains correlations between states that are modeled in the Kalman filter 118. During times in which the platform containing system 100 is static or has little to no attitude rate, or movement in pitch, roll, or yaw, Kalman filter 118 estimates a large level of correlation between body-fixed inertial sensor errors and local-vertical frame fixed velocity errors. When the platform containing system 100 moves in pitch, roll, or yaw such that the sensors 102 sense along the appropriate dimensions of motion, sensors 102 provide measurements that allows processor 116 and Kalman filter 118 to correct local-vertical frame velocity errors, that were unobservable before the movement in pitch, roll, or yaw. Kalman filter 118 will be able to correct inertial sensor errors that were correlated with the local-vertical frame velocity error. Similarly, Kalman filter local-vertical position errors are also correlated with the local vertical velocity error, thus platform movement in pitch, roll, or yaw also enables Kalman filter 118 to correct for a portion of the position error that accumulated during the period of unobserved velocity error.

In some embodiments, the processing of measurements from both IMU 104 and sensors 102 is implemented in software that executes on processor 116. Also, the software that executes on processor 116 is portable to a variety of different platforms. For example, the platform may be an embedded system or a simulation-based platform. Further, a filtering scheme that uses the approach described and that estimates earth-referenced velocity, will observe bounded velocity error provided the platform dynamics meet the requirement defined by the sensors, where the requirements for a single-axis sensor require that the platform moves in at least two of pitch, roll, and yaw. Further, when the requirements are for two single-axis sensors, the platform moves in one of pitch, roll, and yaw.

Figure 2:
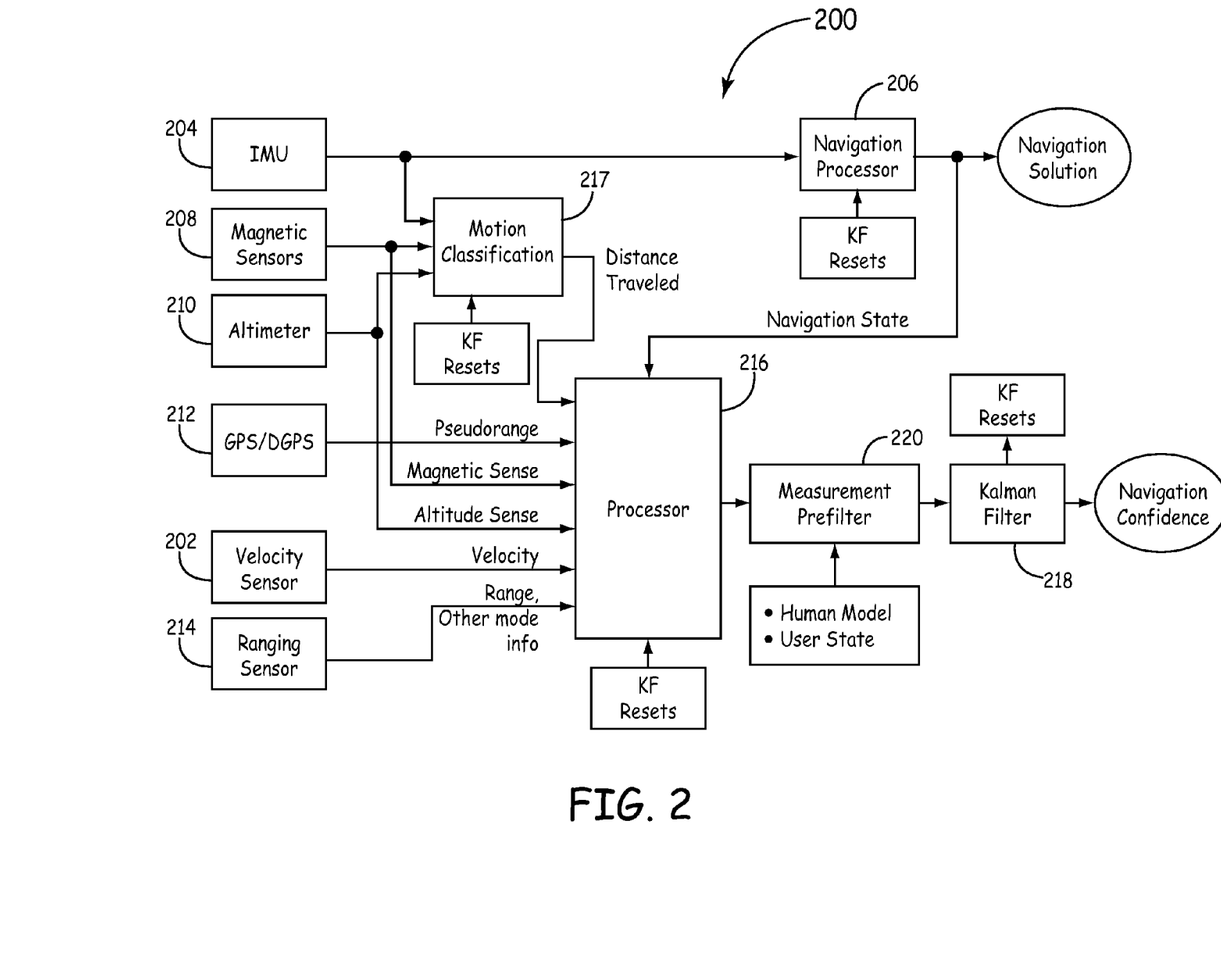
FIG. 2 is a functional block diagram of one embodiment of a system that estimates an n-dimensional parameter using a velocity sensor that measures less than n dimensions.

FIG. 2 is a functional block diagram illustrating the functions of elements within a system, indicated generally at 200, that estimates an n-dimensional parameter using fewer than n single-axis velocity sensors 202. System 200 is similar to system 100 in FIG. 1, however, system 200 further includes additional navigational aides to compensate for error accumulation in the data from the IMU 204. For example, system 200 includes a number of sensors that generate data used to bound the accumulated error in the navigation solution. In one embodiment, system 200 includes magnetic sensors 208, altimeter 210, global positioning system (GPS) 212, and ranging and communication sensor 214. Each of these sensors measures a parameter related to the motion or position of the platform associated with system 200. Magnetic sensors 208 measure compass heading of the platform. Altimeter 210 measures the altitude of the platform. GPS 212 measures the current position of the platform. Ranging sensor 214 measures range and other node information for the platform. Each of these sensors provides input to a processor 216.

In certain embodiments, processor 216 receives input from motion classification circuit 217. Motion classification circuit 217 is coupled to IMU 204, magnetic sensors 208 and altimeter 210. Motion classification circuit 217 provides motion information (such as the distance traveled, gait, and other motion information) to processor 216.

In a further embodiment, processor 216 provides data to a Kalman filter 218 via a prefilter 220. Processor 216, implementing prefilter 220, receives the raw sensor data acquired by the multiple sensors and converts it into a common time base and common coordinate frame. Further, processor 216 and prefilter 220 form a measurement for Kalman filter 218. As described above in relation to FIG. 1, forming a measurement for Kalman filter 218 involves writing the measurement as a linear function of the states of the Kalman filter 218. The writing of the measurements as a linear function is known as forming the "H matrix" of a Kalman filter. In addition, if the navigation states calculated by processor 216 are modeled as navigation errors, processor 216 calculates a measurement difference that is used by Kalman filter 218. The "measurement difference" with multiple aiding sensors is a difference between a quantity derived directly from the navigation solution calculated by navigation processor 206 and the sensor output received from sensors 208, 210, 212, 202, and 214. When Kalman filter 218 calculates correcting information using the measurement from processor 216 and measurement prefilter 220, Kalman filter 218 transmits information to navigation processor 206 that corrects the navigation solution. Kalman filter 218, processor 216, navigation processor 206, and prefilter 220, as described above, refer to functionality and exists as functions performed by a single processor or multiple processors that are communicatively coupled to one another.

FIGS. 3A and 3B are block diagrams of personal navigation systems that estimate a multi-dimensional velocity using single-axis sensors that are fewer in number than the dimensions of the multi-dimensional velocity that is estimated. In FIG. 3A, personal navigation system 300 includes two single-axis velocity sensors 302 and 304. Velocity sensors 302 and 304, in one embodiment, comprise Doppler-based velocity sensors. System 300 further includes an inertial measurement unit (IMU) 306, a processor 308, and a ranging radio 310. Processor 308 perform similar functions to the functionality described for processors 106 and 116 of FIG. 1, respectively. Personal navigation system 300 further includes a battery 312 to provide power for the various components of the system. Further, personal navigation system 300 also includes an antenna 314 that is used in conjunction with processor 310 to communicate the navigation solution from processor 308 to an external base station such as the base station described below and shown in FIG. 4. This embodiment presumes that the trajectory of system 300 will have some motion in either roll, pitch, or yaw so that the velocity fed to processor 310 will have elements of all three dimensions included even though there are only two velocity sensors. In a further example, personal navigation system 300a includes one single-axis velocity sensor 302a, e.g., a Doppler sensor. In this embodiment, the personal navigation system 300a is able to estimate the 3-dimensional velocity with only one single-axis sensor if the system 300a moves in at least two of roll, pitch and yaw.

Figure 4:
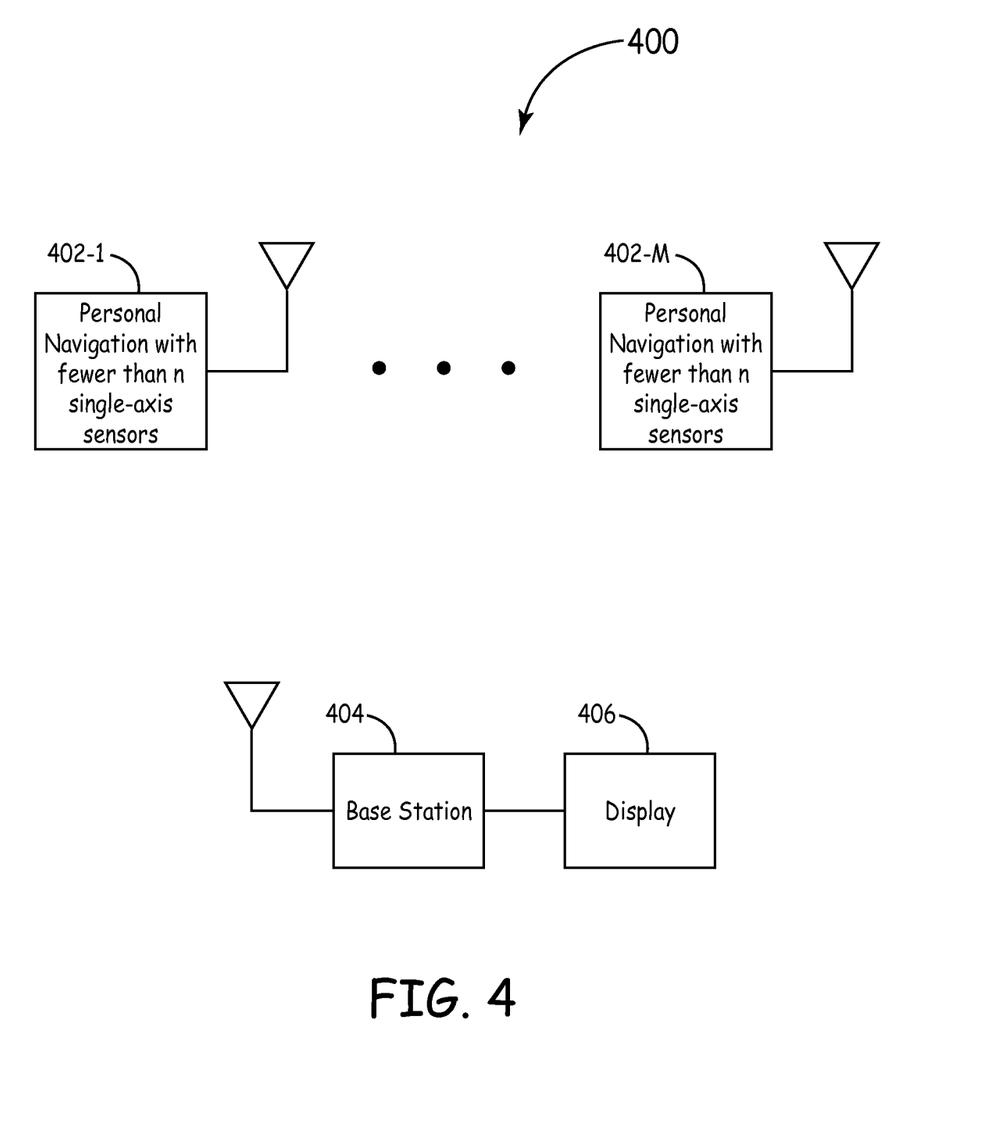
FIG. 4 is a block diagram of a system that displays the location of personal navigation systems in a three-dimensional space in which the personal navigation systems estimate a three-dimensional velocity using one or two single-axis sensors.

FIG. 4 is a block diagram of a system, indicated generally at 400, that displays the location of personal navigation systems 402-1, . . . , 402-M, in a three-dimensional space in which the personal navigation systems estimate a three-dimensional velocity using one or two single-axis sensors. In one embodiment, personal navigation systems 402-1, . . . , 402-M are constructed as described above with respect to either one or more of FIGS. 1, 2, 3A, and 3B. System 400 further includes a base station 404 that communicates with the personal navigation systems 402-1, . . . , 402-M. Base station 404 receives the respective navigation solutions from each of personal navigation systems 402-1, . . . , 402-M and plots the data on display 406. Thus, the current location of each personal navigation systems 402-1, . . . , 402-M is readily viewable on display 406. Such a system 400 could be used at a command center to identify the location of each emergency responder at the scene of an accident, explosion, fire, or the like.

Figure 5:
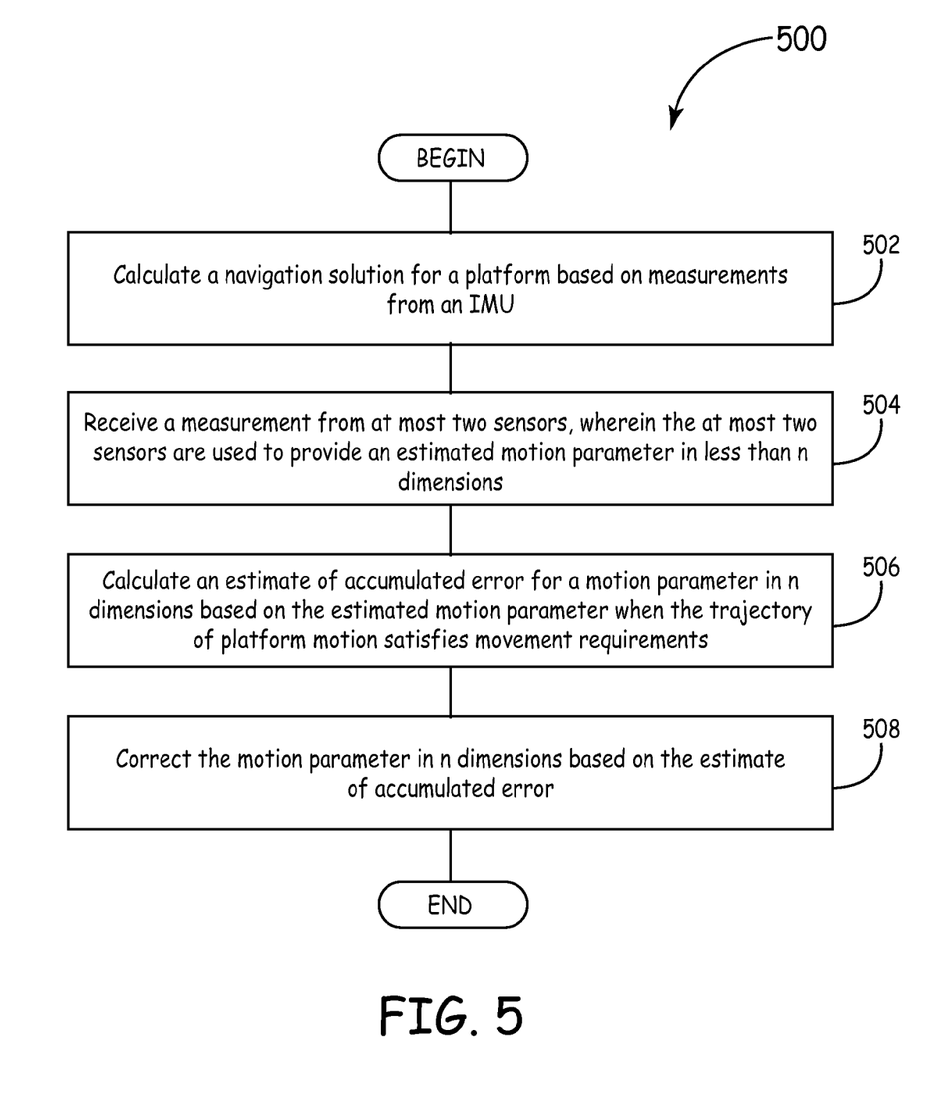
FIG. 5 is a flow diagram of a method for estimating an n-dimensional parameter using a sensor that measures less than n dimensions.

FIG. 5 is a flow diagram of a method 500 for estimating an n-dimensional parameter using a sensor that measures less than n dimensions. Method 500 begins at 502 where a navigation solution is calculated for a platform based on measurements from an IMU. For example, the IMU provides measurements of rotation about three orthogonal axes and acceleration along three orthogonal axes to a navigation processor. Upon receiving the measurements from the IMU, the navigation processor calculates the navigation solution, which contains information describing the position, heading, velocity, and attitude of the platform. Method 500 proceeds at 504 where a measurement from at most two sensors is received, wherein the at most two sensors are used to provide an estimated motion parameter in less than n dimensions. In certain exemplary embodiments, the at most two sensors are single axis velocity sensors that provide estimated measurement of velocity along two axis to a processor, where the processor receives the navigation solution from the navigation processor.

Method 500 proceeds at 506 where an estimate is calculated of accumulated error for a motion parameter in n dimensions based on the estimated motion parameter when the trajectory of platform motion satisfies movement requirements. For example, the processor, having received an estimate of velocity in two dimensions from the sensors, calculates a three dimensional estimate of the velocity when the trajectory of the platform motion has moved in at least one of pitch, roll, and yaw. Method 500 proceeds at 508 where the motion parameter in n dimensions is corrected based on the estimate of accumulated error. For example, the processor determines the difference between the motion parameter in the navigation solution received from the navigation processor and provides the difference as an output to a Kalman filter.

The Kalman filter transmits a correction of the motion parameter to the navigation processor to correct the navigation solution.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A navigational system, the system comprising:
   at least one processor;
   an inertial measurement unit (IMU) that measures a trajectory and provides an output to the at least one processor, the at least one processor providing a navigation solution based on the output of the IMU, wherein the navigation solution includes a calculation of an n-dimensional parameter; and
   at most two velocity sensors that provide an output to the at least one processor, wherein the at most two velocity sensors measure velocity in at most two dimensions, wherein the at least one processor computes an estimate of an n-dimensional parameter from the output of the at most two velocity sensors for bounding errors in the n-dimensional parameter as calculated by the at least one processor when the trajectory measured by the IMU causes the at most two velocity sensors to measure motion through n dimensions, wherein "n" is greater than the number of dimensions measured simultaneously by the at most two velocity sensors.

2. The navigational system of claim 1, wherein the at most two velocity sensors comprise sensors that measure velocity along a single axis.

3. The navigational system of claim 1, further comprising aiding sensors, wherein the aiding sensors provide an output to the at least one processor, the output of the aiding sensors configured to provide an estimate of motion parameters for bounding errors in the navigation solution.

4. The navigational system of claim 3, further comprising a motion classifier that receives the output from a portion of the aiding sensors to provide additional motion information not included in the navigation solution.

5. The navigational system of claim 3, further comprising a Kalman filter that uses a measurement difference calculated by the at least one processor, the measurement difference representing the difference between the motion information derived from the navigation solution and data collected from the at most two velocity sensors and the aiding sensors, wherein the Kalman filter provides navigation corrections to the navigation solution.

6. The navigational system of claim 5, wherein the at least one processor is configured to prefilter the measurement difference calculated by the at least one processor before the measurement difference is used by the Kalman filter.

7. The navigational system of claim 1, wherein the at most two velocity sensors is a single sensor and the at least one processor provides an estimate of a three dimensional parameter when the trajectory satisfies the movement requirement by including motion in at least two of pitch, roll, and yaw where the single sensor provides a sensor measurement along three dimensions.

8. The navigational system of claim 1, wherein the at most two velocity sensors are two sensors and the at least one processor provides an estimate of a three dimensional parameter when the trajectory satisfies the movement requirement by including motion in at least one of pitch, roll, and yaw where the two sensors provide sensor measurements along three dimensions.

9. The navigational system of claim 1, wherein the IMU and the at least two velocity sensors are part of a personal navigation system.

10. A method for bounding motion errors, the method comprising:
    calculating a navigation solution for a platform based on measurements from an IMU;
    receiving a measurement from at most two velocity sensors, wherein the at most two velocity sensors are used to provide an estimated velocity parameter in less than n dimensions, wherein "n" is greater than the number of dimensions measured simultaneously by the at most two velocity sensors;
    calculating an estimate of accumulated error for a motion parameter in n dimensions based on the estimated velocity parameter when a trajectory of platform motion causes the at most two velocity sensors to measure motion through n dimensions; and
    correcting the motion parameter in n dimensions based on the estimate of accumulated error.

11. The method of claim 10, wherein the at most two velocity sensors provide an estimated velocity measurement in less than n dimensions.

12. The method of claim 10, further comprising using the estimated velocity measurement to correct acceleration measurements by the IMU in n dimensions.

13. The method of claim 10, wherein calculating an estimate of accumulated error is further based on motion information received from aiding sensors.

14. The method of claim 13, wherein the aiding sensors comprise at least one of:
    a magnetic sensor;
    an altimeter;
    a GPS; and
    a ranging device.

15. A system for tracking movement, the system comprising
    at least one navigation system, wherein the at least one navigation system comprises:
       at least one processor;
       an inertial measurement unit (IMU) coupled to the at least one processor, the at least one processor providing a navigation solution for a platform based on the output of the IMU, wherein the navigation solution includes a calculation of an n-dimensional motion parameter;
       a sensor configured to measure a motion parameter in at most two dimensions,
       wherein the at least one processor is further configured to receive the motion parameter from the sensor and provide an estimate of the n-dimensional motion parameter for use in bounding the error of the n-dimensional motion parameter as calculated by the at least one processor when the trajectory measured by the IMU satisfies movement requirements, wherein the estimate is based on the motion parameter and n is greater than the dimensions measured by the sensor; and
       a transmitter configured to transmit the navigation solution; and
    a base station that receives navigation solutions from the at least one navigation system.

16. The system of claim 15, wherein the sensor measures the motion parameter in one dimension and the navigation solution calculated by the at least one processor includes an estimate of a three dimensional motion parameter when the platform experiences movement in at least two of pitch, roll, and yaw.

17. The system of claim 15, wherein the sensor measures the motion parameter in two dimensions and the navigation solution calculated by the at least one processor includes an estimate of a three dimensional motion parameter when the platform experiences movement in at least one of pitch, roll, and yaw.

18. The system of claim 15, wherein the sensor measures velocity in at most two dimensions.

19. The system of claim 15, wherein the at least one navigation system further comprises aiding sensors, wherein the aiding sensors provide an output to the at least one processor, the output of the aiding sensors configured to provide an estimate of motion parameters for bounding errors in the navigation solution.

20. The system of claim 19, further comprising a motion classifier that receives the output from a portion of the aiding sensors to provide additional motion information not included in the navigation solution.

\* \* \* \* \*